United States Patent [19]

Gasser

[11] Patent Number: 4,499,988

[45] Date of Patent: Feb. 19, 1985

[54] METHOD AND APPARATUS FOR DEFLECTING ARTICLES DURING THEIR CONVEYANCE

[75] Inventor: Markus Gasser, Gächlingen, Switzerland

[73] Assignee: SIG Schweizerische Industrie-Gesellschaft, Neuhausen am Rheinfall, Switzerland

[21] Appl. No.: 491,239

[22] Filed: May 3, 1983

[30] Foreign Application Priority Data

May 3, 1982 [CH] Switzerland .......................... 2706/82

[51] Int. Cl.³ ............................................. B65G 47/46
[52] U.S. Cl. .................................... 198/369; 198/435; 198/592
[58] Field of Search ............... 198/435, 436, 592, 812, 198/437, 366, 369, 370

[56] References Cited

U.S. PATENT DOCUMENTS

| 3,648,820 | 3/1972 | Schafer et al. ........................ 198/358 |
| 4,210,237 | 7/1980 | Gram .................................... 198/812 |

FOREIGN PATENT DOCUMENTS

| 2421610 | 11/1974 | Fed. Rep. of Germany ...... 198/436 |
| 416294 | 1/1967 | Switzerland ........................ 198/436 |
| 647151 | 12/1950 | United Kingdom ................ 198/366 |
| 548504 | 3/1977 | U.S.S.R. ............................... 198/812 |
| 908672 | 3/1982 | U.S.S.R. ............................... 198/812 |

Primary Examiner—Joseph E. Valenza
Assistant Examiner—Jonathan D. Holmes
Attorney, Agent, or Firm—Spencer & Frank

[57] ABSTRACT

An apparatus for selectively routing articles from a supply conveyor belt to an upper delivery conveyor and a lower delivery conveyor. The apparatus has first, second and third deflecting rollers about which the supply conveyor belt is successively trained. The first and second deflecting rollers are at about the same height level, while the third deflecting roller is therebelow. The first deflecting roller defines a first discharge end and an upper reach, while the third deflecting roller defines a second discharge end and a lower reach of the supply conveyor belt. The first deflecting roller can assume an advanced position in which articles advanced on the upper reach are transferred from the first discharge end onto the upper delivery conveyor and a withdrawn position in which articles advanced on the upper reach are transferred from the first discharge end onto the lower reach. The third deflecting roller can assume an upper position in which the lower reach extends approximately parallel to the upper reach and a lower position in which the lower reach slopes downwardly to the lower delivery conveyor and in which articles advanced on the lower reach are transferred from the second discharge end onto the lower delivery conveyor.

10 Claims, 5 Drawing Figures

METHOD AND APPARATUS FOR DEFLECTING ARTICLES DURING THEIR CONVEYANCE

BACKGROUND OF THE INVENTION

This invention relates to a method and an apparatus for selectively deflecting articles, advanced on a supply conveyor, onto one of two conveyor belts.

In packaging systems, particularly for confectionary products such as chocolate bars or the like, it is known—as disclosed, for example, in U.S. Pat. No. 3,648,820—to arrange, for example, three packaging machines in series and to detour, by means of deflectors, the articles to be packaged from a longitudinal conveyor track onto transversely extending conveyor tracks. The delivery end of the deflector described in the noted patent is lowered 15° out of the horizontal conveyor track and then withdrawn horizontally, whereby the downwardly advanced articles drop onto a lower transverse conveyor track. In order to ensure that the articles end up on the transverse conveyor track, an abutment plate is provided at which the articles may accumulate during their downward movement. Such an arrangement can find practical use only downstream of an article separating (single file forming) station because otherwise the articles arriving at random would crowd at the delivery end of the deflector during the withdrawal thereof. Further, this arrangement is not adapted for transferring articles to an accumulator belt (on which, in case of a breakdown of one machine, as many articles as possible should be accumulated along the shortest possible path) because of the unavoidable cadenced operation.

SUMMARY OF THE INVENTION

It is an object of the invention to provide an improved apparatus for deflecting articles from a supply conveyor belt onto one of two delivery belts while continuously moving the articles and ensuring that either the one or the other conveyor belt moves away the articles without any accumulation. It is a further object to prevent the articles from falling freely or sliding on a chute and abutting against a baffle plate and from jamming during transfer.

These objects and others to become apparent as the specification progresses, are accomplished by the invention, according to which, briefly stated, the apparatus for selectively routing articles from a supply conveyor belt to an upper delivery conveyor and a lower delivery conveyor has first, second and third deflecting rollers about which the supply conveyor belt is successively trained. The first and second deflecting rollers are at about the same height level, while the third deflecting roller is therebelow. The first deflecting roller defines a first discharge end and an upper reach, while the third deflecting roller defines a second discharge end and a lower reach of the supply conveyor belt. The first deflecting roller can assume an advanced position in which articles advanced on the upper reach are transferred from the first discharge end onto the upper delivery conveyor and a withdrawn position in which articles advanced on the upper reach are transferred from the first discharge end onto the lower reach. The third deflecting roller can assume an upper position in which the lower reach extends approximately parallel to the upper reach and a lower position in which the lower reach slopes downwardly to the lower delivery conveyor and in which articles advanced on the lower reach are transferred from the second discharge end onto the lower delivery conveyor.

DESCRIPTION OF THE PREFERRED EMBODIMENT

Figure 1:
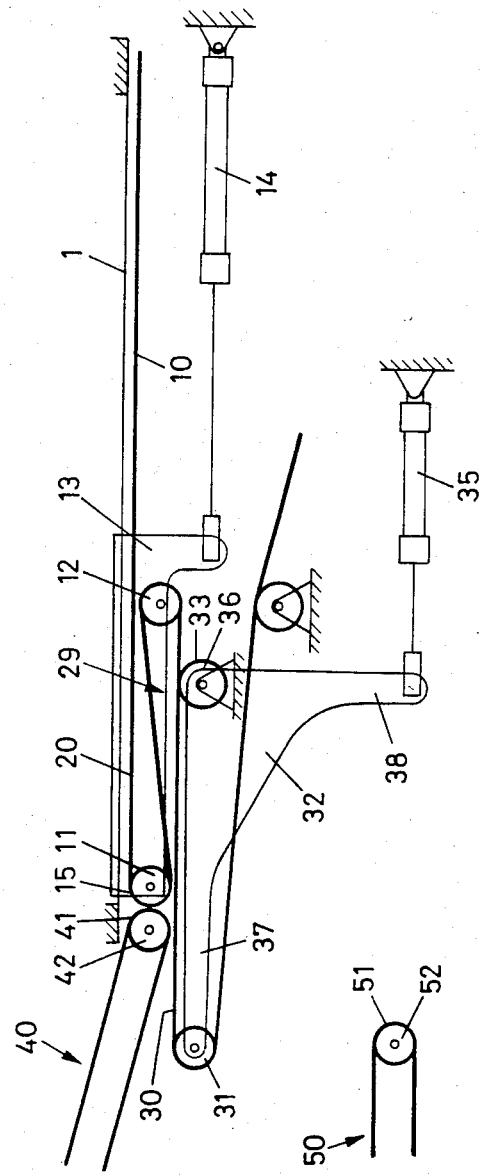
FIG. 1 is a schematic side elevational view of a preferred embodiment of the invention.

Turning now to FIG. 1, on a stationary machine frame 1 there is mounted a carriage 13 which supports two belt deflecting rollers 11 and 12 and which is horizontally displaceable by a power cylinder (pneumatic cylinder) 14. A bell crank lever 32 is pivotally supported at 36 and carries at one end of one of its legs 37 a further deflecting roller 31. To the end of a second leg 38 of the bell crank lever 32 there is connected a further power cylinder (pneumatic cylinder) 35. FIG. 1 further shows the discharge (downstream) portion of a supply conveyor 10 consecutively trained about deflecting rollers 11, 12 and 31.

Two conveyor belts 40 and 50 are arranged vertically spaced from one another; their respective charging (upstream) ends 41 and 51 are trained about respective end rollers 42 and 52. The end rollers 42 and 52 are vertically offset in the direction of conveyance; the deflecting roller 31 at the end of the leg 37 is arranged below the deflecting roller 42 of the upper delivery belt 40 such that upon pivoting the bell crank lever 32 into a lower end position, the deflecting roller 31 is almost in engagement with the upstream end 51 of the lower delivery belt 50.

In the description which follows, the operation of the above-described apparatus will be set forth with particular reference to FIGS. 2 to 5.

Figure 2:
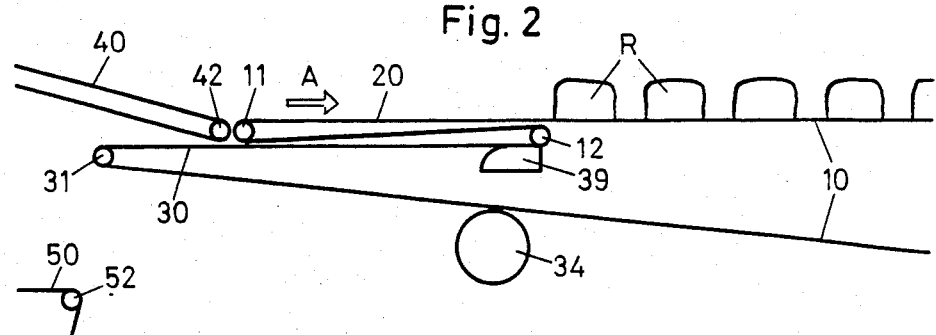
FIGS. 2, 3, 4 and 5 are schematic side elevational views of one part of the structure shown in FIG. 1, depicting different operational phases.

In the normal operation as shown in FIG. 2, the articles R such as chocolate bars are conveyed from right to left on the upper reach 20 of the supply conveyor belt 10 and at the downstream or discharge end thereof the articles are transferred onto the charging (upstream) end 41 of the delivery conveyor belt 40.

Figure 3:
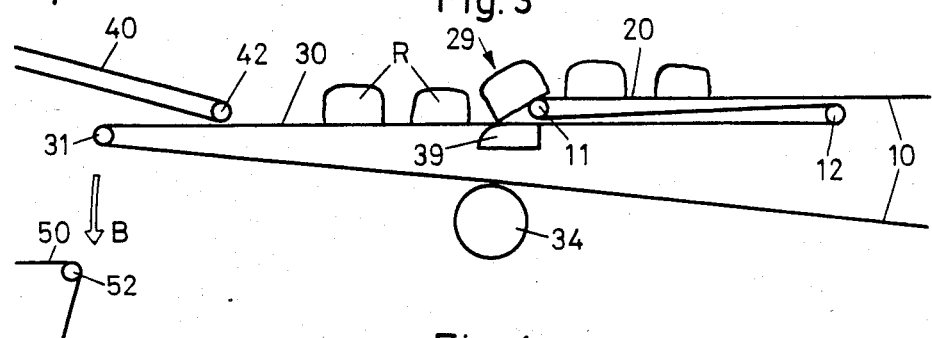

In case of an operational disturbance involving the upper delivery conveyor belt 40, such as, for example, a stoppage of a packaging machine normally supplied by the conveyor belt 40, the pneumatic cylinder 14 is actuated whereupon the carriage 13 moves, with the two deflecting rollers 11 and 12 in the direction of the arrow A towards the right until the rollers 11 and 12 assume a position shown in FIG. 3. As a result, the articles R are now transferred over the frontal deflecting roller 11 onto the lower reach 30 of the conveyor belt 10. As the carriage 13 reaches its end position during the rightward travel, a switch is automatically actuated whereupon the pneumatic cylinder 35 is energized for pivoting the bell crank lever 32 counterclockwise about its pivot at 36 (FIG. 1) in the direction of the arrow B (FIG. 3). By means of the additional effective path length on the lower reach 30 an additional conveyor length is provided on which the articles R are advanced during the pivotal motion of the bell crank lever 32.

Figure 4:
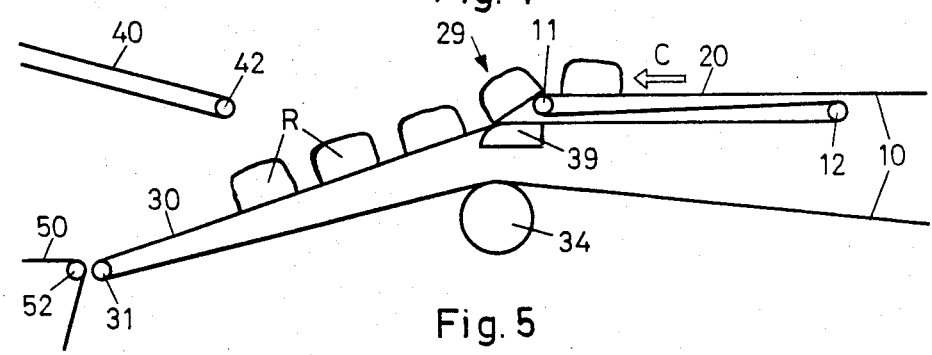

Upon reaching the lower end position as shown in FIG. 4, the lower conveyor belt 50 is started and the articles R are thus admitted from the lower reach 30 of the supply conveyor belt 10 to the lower conveyor belt 50.

As soon as the operational disturbance that has involved the upper conveyor belt 40 is eliminated, the carriage 13 is displaced towards the left in the direction of the arrow C as shown in FIG. 4, until the discharge (downstream) end 15 of the upper reach 20 of the supply conveyor belt 10 is positioned at the charging (upstream) end 41 of the upper conveyor belt 40. Upon reaching this position, the upper conveyor belt 40 is restarted. Since the speed of the carriage 13 in the direction of the arrow C is chosen to be greater than the conveying speed of the supply conveyor belt 10, upon encounter of the two ends 15 and 41 (FIG. 1) a danger of jamming of an article R between the two ends is securely eliminated. The frontal discharge end 15 of the upper reach 20 cannot collide with the articles R situated on the lower reach 30 of the supply conveyor belt 10 because the articles R on the downwardly oriented lower reach 30 are rapidly moved away from the transfer zone between the upper reach 20 and the lower reach 30.

Figure 5:
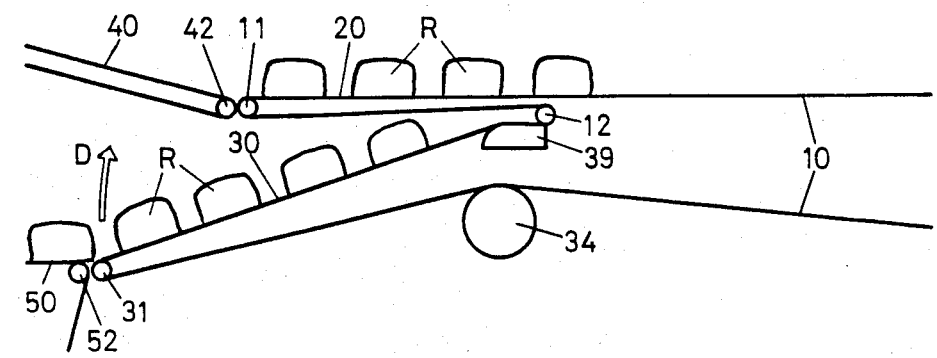

After a certain period of time which should be sufficient for all articles R to be transferred from the lower reach 30 onto the lower delivery conveyor belt 50, the bell crank lever 32 is, as indicated by the arrow D of FIG. 5, pivoted upwardly so that the spatial and operational relationships shown in FIG. 2 are reestablished.

At the zone of transfer 29 a roller 33 is arranged, whose axis may simultaneously form the pivotal axis of the bell crank lever 32, as illustrated in FIG. 1. Since the pivotal angle of the bell crank lever 32 is only about 15°, it is feasible to replace the roller 33 with a slide block 39 supporting the belt 10 as shown in FIGS. 2–5. There is further provided a deflecting roller 34 to generate a location of deflection in the belt 10 upon downward pivotal motion of the lower reach 30.

The various switching operations such as the pivotal motion triggered by the carriage 13 reaching its end position, the starting of the lower delivery conveyor belt 50 after the bell crank lever 32 has reached its downwardly pivoted position and the starting of the upper delivery conveyor belt 40 after the upper reach 20 has attained its frontal end position may be effected in a known manner pneumatically and automatically, because the shown positions represent in each instance the various end positions of the two pneumatic cylinders 14 and 35. As an alternative, it is feasible to use known electric limit switches which are actuated by the various positions of the carriage 13 and/or the bell crank lever 32.

In accordance with the requirement mentioned earlier, the invention provides that the articles R are at no point in their travel allowed to move by themselves (that is, by inertia or gravity) but are at all times displaced solely by conveyor belts. Only at the transfer location from the upper reach 20 to the lower reach 30 according to FIGS. 3 and 4, have the articles R to overcome a step which is constituted by the end roller 11. Since, however, the lower reach 30 has the same velocity as the upper reach 20, the articles R, without free movement, are being taken over by the lower reach 30.

It will be understood that the above description of the present invention is susceptible to various modifications, changes and adaptations, and the same are intended to be comprehended within the meaning and range of equivalents of the appended claims.

What is claimed is:

1. In a conveyor assembly comprising an upper and a lower delivery conveyor each having a respective charging end, a supply conveyor belt carrying articles in a feed direction and having a discharge zone adjacent the charging ends of the upper and lower delivery conveyor, and an apparatus for selectively routing articles from the discharge zone of said supply conveyor belt onto the charging end of said upper delivery conveyor or onto the charging end of said lower delivery conveyor; the improvement in said apparatus comprising:
   (a) a first deflecting roller; said supply conveyor belt being trained about said first deflecting roller; said first deflecting roller defining an upper reach and a first discharge end of said supply conveyor belt; the articles being carried by said supply conveyor belt into said discharge zone on said upper reach;
   (b) a second deflecting roller spaced from said first deflecting roller in a direction generally parallel to said feed direction and upstream of said first deflecting roller as viewed in said feed direction; said supply conveyor belt being trained about said second deflecting roller from said first deflecting roller;
   (c) first displaceable means supporting said first deflecting roller and movable, with said first deflecting roller, in a direction parallel to said feed direction, into advanced and withdrawn positions; in said advanced position of said first displaceable means said first deflecting roller being positioned in the immediate vicinity of said charging end of said upper delivery conveyor, whereby articles from said upper reach are transferred to said upper delivery conveyor; in said withdrawn position said first deflecting roller being situated upstream spaced from said charging end of said upper delivery conveyor, whereby articles from said upper reach are prevented from being transferred to said upper delivery conveyor;
   (d) a third deflecting roller situated at a height level below that of said first deflecting roller; said supply conveyor belt being trained about said third deflecting roller from said second deflecting roller; said third deflecting roller defining a lower reach and a second discharge end of said supply conveyor belt; in said withdrawn position of said first displaceable means said first discharge end of said supply conveyor belt cooperating with said lower reach, whereby articles are transferred from said upper reach to said lower reach; and
   (e) second displaceable means supporting said third deflecting roller and being swingable, with said third deflecting roller, into upper and lower positions; in said upper position said lower reach extending at least approximately parallel with said upper reach and in said lower position said third deflecting roller being positioned in the immediate vicinity of said charging end of said lower delivery conveyor, whereby articles advanced on said lower reach are transferred to said lower delivery conveyor.

2. A conveyor assembly as defined in claim 1, wherein said second deflecting roller is supported on said first displaceable means.

3. A conveyor assembly as defined in claim 1, further comprising a belt supporting and deflecting means situated underneath said lower reach in a zone where articles are transferred to said upper reach to said lower reach, said lower reach being guided by said belt supporting and deflecting means at least in said lower position of said second displaceable means.

4. A conveyor assembly as defined in claim 3, wherein said belt supporting and deflecting means comprises a fixed slide block.

5. A conveyor assembly as defined in claim 3, wherein said belt supporting and deflecting means comprises a fourth deflecting roller.

6. A conveyor assembly as defined in claim 5, further comprising a shaft for supporting said fourth deflecting roller for rotation; said second displaceable means being pivotally supported by said shaft.

7. A conveyor assembly as defined in claim 1, wherein said third deflecting roller is situated downstream of said first deflecting roller when said first displaceable means is in said advanced position and said second displaceable means is simultaneously in said upper position.

8. A method of deflecting articles performed with an apparatus which comprises an upper and a lower delivery conveyor each having a respective charging end, a supply conveyor belt carrying articles in a feed direction and having a discharge zone adjacent the charging ends of the upper and lower delivery conveyor, an apparatus for selectively routing articles from the discharge zone of said supply conveyor belt onto the charging end of said upper delivery conveyor or onto the charging end of said lower delivery conveyor, a first deflecting roller; said supply conveyor belt being trained about said first deflecting roller; said first deflecting roller defining an upper reach and a first discharge end of said supply conveyor belt; the articles being carried by said supply conveyor belt into said discharge zone on said upper reach; a second deflecting roller spaced from said first deflecting roller in a direction generally parallel to said feed direction and upstream of said first deflecting roller as viewed in said feed direction; said supply conveyor belt being trained about said second deflecting roller from said first deflecting roller; first displaceable means supporting said first deflecting roller and movable, with said first deflecting roller, in a direction parallel to said feed direction, into advanced and withdrawn positions; in said advanced position of said first displaceable means said first deflecting roller being positioned in the immediate vicinity of said charging end of said upper delivery conveyor, whereby articles from said upper reach are transferred to said upper delivery conveyor; in said withdrawn position said first deflecting roller being situated upstream spaced from said charging end of said upper delivery conveyor, whereby articles from said upper reach are prevented from being transferred to said upper delivery conveyor; a third deflecting roller situated at a height level below that of said first deflecting roller; said supply conveyor belt being trained about said third deflecting roller from said second deflecting roller; said third deflecting roller defining a lower reach and a second discharge end of said supply conveyor belt; in said withdrawn position of said first displaceable means said first discharge end of said supply conveyor belt cooperating with said lower reach, whereby articles are transferred from said upper reach to said lower reach; and second displaceable means supporting said third deflecting roller and being swingable, with said third deflecting roller, into upper and lower positions; in said upper position said lower reach extending at least approximately parallel with said upper reach and in said lower position said third deflecting roller being positioned in the immediate vicinity of said charging end of said lower delivery conveyor, whereby articles advanced on said lower reach are transferred to said lower delivery conveyor;

comprising the following steps:

(a) driving said supply conveyor belt with an article supply speed;

(b) shifting said first displaceable means from said advanced position to said withdrawn position for discontinuing transfer of articles from said upper reach to said upper delivery conveyor and for starting transfer of articles from said upper reach to said lower reach;

(c) starting a swinging motion of said second displaceable means from said upper position towards said lower position upon said first displaceable means reaching said withdrawn position; and (d) starting said lower delivery conveyor at the latest when said second displaceable means reaches said lower position.

9. A method as defined in claim 8, further comprising the following steps for routing articles to said upper delivery conveyor:

(e) subsequent to step (d), shifting said first displaceable means from said withdrawn position to said advanced position;

(f) starting said upper delivery conveyor at the latest when said first displaceable means reaches said advanced position; and (g) after a delay following completion of step (e), swinging said second displaceable means from said lower position into said upper position.

10. A method as defined in claim 9, wherein the speed of shifting said first displaceable means from said withdrawn position to said advanced position is greater than said article supply speed of said supply conveyor belt.

* * * * *